(12) United States Patent
Sharique et al.

(10) Patent No.: US 9,477,699 B2
(45) Date of Patent: Oct. 25, 2016

(54) STATIC ROW IDENTIFIER SPACE PARTITIONING FOR CONCURRENT DATA INSERTION IN DELTA MEMORY STORE

(71) Applicants: Muhammed Sharique, Mumbai (IN); Mihnea André, Issy les Moulineaux (FR); Rolando Maldonado Blanco, Ontario (CA); Anil Kumar Goel, Ontario (CA)

(72) Inventors: Muhammed Sharique, Mumbai (IN); Mihnea André, Issy les Moulineaux (FR); Rolando Maldonado Blanco, Ontario (CA); Anil Kumar Goel, Ontario (CA)

(73) Assignee: Sybase, Inc., Dublin, CA (US)

( * ) Notice: Subject to any disclaimer, the term of this patent is extended or adjusted under 35 U.S.C. 154(b) by 262 days.

(21) Appl. No.: 14/143,610

(22) Filed: Dec. 30, 2013

(65) Prior Publication Data

US 2015/0186433 A1    Jul. 2, 2015

(51) Int. Cl.
*G06F 17/30*    (2006.01)

(52) U.S. Cl.
CPC ..... *G06F 17/30315* (2013.01); *G06F 17/3038* (2013.01); *G06F 17/30584* (2013.01)

(58) Field of Classification Search
CPC ............. G06F 17/30362; G06F 11/1448; G06F 17/30309; G06F 17/30368; G06F 17/30371; G06F 17/30312; G06F 17/30315; G06F 17/30339; G06F 2201/80; G06F 2201/825; G06F 2201/84; G06F 2201/87
See application file for complete search history.

(56) References Cited

U.S. PATENT DOCUMENTS

| | | | |
|---|---|---|---|
| 5,717,919 A | 2/1998 | Kodvalla et al. | |
| 5,884,307 A * | 3/1999 | Depledge | G06F 17/30312 |
| 5,956,704 A * | 9/1999 | Gautam | G06F 17/30377 |
| 7,676,551 B1 | 3/2010 | Dalia et al. | |
| 7,996,633 B2 | 8/2011 | Zimmerer et al. | |
| 8,121,985 B2 | 2/2012 | Krebs | |
| 8,527,556 B2 | 9/2013 | Vaitheeswaran et al. | |
| 2011/0161379 A1 | 6/2011 | Plattner et al. | |
| 2011/0202497 A1 | 8/2011 | Marschall et al. | |
| 2011/0213775 A1 | 9/2011 | Franke et al. | |
| 2011/0219020 A1* | 9/2011 | Oks | G06F 17/30 707/769 |
| 2011/0231403 A1* | 9/2011 | Oks | G06F 9/5083 707/741 |
| 2012/0016901 A1 | 1/2012 | Agarwal et al. | |
| 2012/0084278 A1 | 4/2012 | Franke et al. | |
| 2012/0303628 A1 | 11/2012 | Silvola | |
| 2013/0006988 A1 | 1/2013 | Li et al. | |
| 2013/0091144 A1 | 4/2013 | Peters et al. | |
| 2013/0179395 A1 | 7/2013 | Heman et al. | |

* cited by examiner

*Primary Examiner* — Rehana Perveen
*Assistant Examiner* — Alexander Khong
(74) *Attorney, Agent, or Firm* — Mintz Levin Cohn Ferris Glovsky and Popeo, P.C.

(57) ABSTRACT

The current subject matter describes static partitioning and sub-partitioning of a row identifier space associated with a table in a delta memory store of a database so as to allow data to be concurrently inserted into rows identified by the corresponding sub-partitions. A server system associated with the database can receive data to be inserted into a database. The server system can select a sub-fragment of a row identifier space identifying identifiers of rows stored in the database for the table. The sub-fragment can be selected based on a preference specified by an insert operation used for insertion of the data into the columnar database and on availability of the sub-fragment. The server system can insert the data in rows identified by the selected sub-fragment while other data is being concurrently inserted in rows identified by other one or more sub-fragments of the row identifier space.

17 Claims, 5 Drawing Sheets

STATIC ROW IDENTIFIER SPACE PARTITIONING FOR CONCURRENT DATA INSERTION IN DELTA MEMORY STORE

TECHNICAL FIELD

The subject matter described herein relates to statically partitioning and sub-partitioning a row identifier space associated with a table in a delta memory store of a database so as to allow data to be concurrently inserted into rows identified by the corresponding sub-partitions of the row identifier space.

BACKGROUND

Often multiple computing threads are used to insert data into a same table of a database. Traditionally, these computing threads insert data into the table in a serial fashion (that is, one computing thread after another computing thread for insertion). The insertion of data associated with up to a few computing threads (for example, six to eight computing threads) can occur fast without affecting database performance. However, when a significant number of computing threads (for example, eight or more computing threads) try to insert data at a same time into the same table, a significant delay can be noticed and database performance can significantly degrade. Using TPC-H schema, which is a standard for measuring performance of databases, it can be observed that scaling performance associated with load operation on a conventional database degrades when eight to fifteen computing threads attempt to insert data into the table, and that the scaling performance stops when sixteen or more computing threads attempt to insert data into the table.

SUMMARY

The current subject matter describes statically partitioning and sub-partitioning a row identifier space associated with a table in a delta memory store of a database in order to allow data to be concurrently inserted into rows identified by the corresponding sub-partitions of the row identifier space, wherein each table can have a corresponding plurality of row identifier spaces.

In one aspect, a server system including at least one data processor can receive data from a computing device that is to be inserted into a database including a main store (for example, a disk memory store) and a delta memory store. The main store can also be referred to as main memory store in some implementations. The server system can select a sub-fragment of a row identifier space identifying identifiers of rows stored in a table of the database. The sub-fragment can be selected based on a database-wide value and an availability of the sub-fragment. The server system can insert the data in one or more rows identified by the selected sub-fragment while other data is being concurrently inserted in one or more rows identified by other one or more sub-fragments of the row identifier space.

In some variations, one or more of the following can be implemented individually or in any suitable combination. The database can be a columnar relational database. The server system can be connected to the computing device via a communication network. The sub-fragment can be selected from a plurality of sub-fragments of the row identifier space. The count of the plurality of sub-fragments can be equal to: {(a count of row identifiers in the row identifier space−(a count of row identifiers in a portion of the row identifier space associated with the main store+1))/count of delta fragments in the row identifier space}/(Count of central processing units on the server system). The count of row identifiers in the row identifier space can be a first value (for example, $2^{64}$), and the count of row identifiers in a portion of the row identifier space associated with the main store can be a second value (for example, $2^{48}$) that is less than the first value. The row-identifier space can be a row-identifier space generated when the server system most-recently merged data in the delta memory store with the main store. The server system can generate a new row-identifier space for a table T with every merge of table T's data in the delta memory store with the main store. The data inserted in the selected sub-fragment can be associated with a first computing thread. The another data concurrently inserted in other one or more sub-fragments can be associated with corresponding one or more computing threads that are different from the first computing thread. Two or more computing threads can be generated from corresponding two or more computing devices. Further, the server system can register the rows with the inserted data by generating a bitmap that indicates the one or more rows in the database that includes the inserted data. The server system can use the bitmap to retrieve the inserted data from the database. The sub-fragment can be selected based on a sequential search of sub-fragment identifiers. A resource can be allocated to the selected sub-fragment only when the selected sub-fragment is being used. Data in the database can be accessed via a read operation. Performance of the read operation can be independent of the one or more sub-fragments and the concurrent insertion of data. The read operation can be one of a fetch based read operation and a column scan.

Computer program products are also described that comprise non-transitory computer readable media storing instructions, which when executed by at least one data processors of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected, and can exchange data, commands, instructions, and/or the like via one or more connections. These connections can include one or more of: a connection over a network (for example, the Internet, a wireless network, a local area network, a wide area network, a wired network, or the like), a direct connection (wired or peer-to-peer wireless) between one or more of the computing systems, and other connections.

The subject matter described herein provides many advantages. For example, a server system can allow multiple computing threads to concurrently insert data into a table in a delta memory store (for example, an in-memory store) of a database. The concurrent insertion can result in a significant improvement in database performance when the computing threads trying to insert data into the database are eight or more in number.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
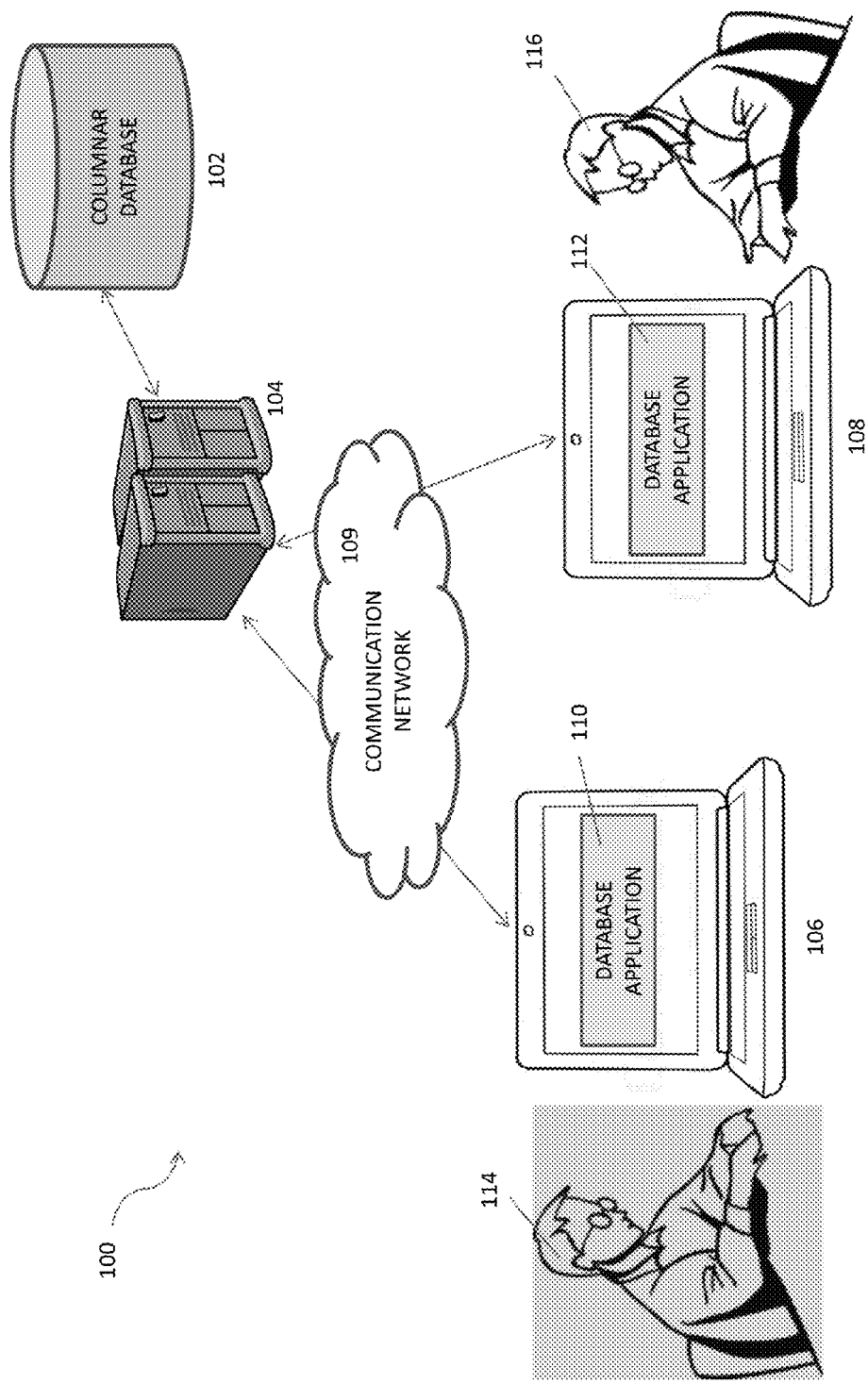
FIG. 1 is a system-diagram illustrating a concurrent insertion of data associated with various computing threads into a columnar database.

FIG. 1 is a system-diagram 100 illustrating a concurrent insertion of data associated with various computing threads into a table in a columnar database 102. The columnar database 102 can be associated with (for example, connected to) a server system 104 to form a column-based relational database system that can be used for one or more of: database management, analytics and business intelligence, mobile enterprise, mobile messaging, mobile commerce, and modeling and development. One example of this relational database system can be SYBASE IQ. The server system 104 can control the database 102 and serve computing systems 106 and 108. A communication network 109 can connect the server system 104 with the computing systems 106 and 108. The computing systems 106 and 108 can execute instances 110, 112, respectively, of a database application (for example, an enterprise resource planning application). A first user 114 can enter data associated with a first computing thread on the instance 110 of the database application, and a second user 116 can enter data associated with a second computing thread on the instance 112 of the database application.

The database 102 can include a main store (for example, a disk memory store) and a delta memory store. The table in the delta memory store can include a previous delta fragment and a new delta fragment, as described in more detail below by system-diagram 400. Each of the previous delta fragment and the new delta fragment can be associated with corresponding row identifier spaces, which are also referred to herein as RID spaces. A row identifier space can be a storage space within a table of the database 102; and the row identifier space can include row identifiers of rows stored in the main store of the database 102 and of rows stored in various fragments of the delta memory store of the database 102, as described in more detail below by diagram 500. More specifically, fragments and RID spaces can be associated to tables, and each table can have its own corresponding RID spaces. Tables can be stored in the database. Generally, tables can have data in both the main store and the delta memory store of the database. The server system 104 can insert data of new transactions by any user into the new delta fragment. The server system 104 can continue to provide a read access to the previous delta fragment to the old users using old transactions, but can provide a read access to the new delta fragment to the new users. For a table, all the data of the previous delta fragment can be merged with the main store portion (for example, disk portion) of the table in database 102 at regular intervals of time or on-demand by an administrator of the database 102. Once all the old users stop accessing the previous delta fragment, the previous delta fragment can be destroyed.

The server system 104 can statically partition and sub-partition row identifier space in a table stored in the database 102. The database 102 can allow separate data to be concurrently written to corresponding sub-partitions of the row identifier space for the table, wherein each sub-partition can allow a single insert operation to insert data in one or more rows identified by that sub-partition at any time. Thus, while the server system 104 inserts data associated with the first computing thread into one or more rows identified by a first sub-partition of the row identifier space, the server system 104 can simultaneously/concurrently insert data associated with the second computing thread into one or more rows identified by another sub-partition. Although the server system 104 is described as concurrently inserting data associated with two computing threads, in other implementations, the server system 104 can insert data associated with any number of computing threads (for example, sixteen or more computing threads in order to overcome the problems of degraded or stopped database performance, as noted above with respect to the conventional serial insertions of data).

The columnar database 102 can store data in the table as sections of columns rather than as sections of rows. The columnar database 102 can provide search results in response to a search query by a user in a time that can be significantly less than time taken by some conventional database systems to provide search results. Using the columnar database 102 can be more efficient than other databases when a computation needs to be performed over significantly high number of rows and a significantly low number of columns, because reading the significantly low number of columns can be faster than reading all data. Additionally, using the columnar database 102 can be more efficient than other databases when new values of a column are provided for all rows at a same time, because those new values can be written efficiently and old column data can be replaced without affecting any other columns for the rows. The server system 104 can include a plurality of central processing units (CPUs), which can also be referred to as cores. Each CPU can include one or more microprocessors and/or one or more microcontrollers.

Each of the computing systems 106 and 108 can be one of: laptop computer, a desktop computer, a tablet computer, a phablet computer, a smart phone, a cellular phone, and any other computing device. The computing systems 106 and 108 can be either same of different. The communication network 109 can be one or more of: local area network, a wide area network, internet, intranet, Bluetooth network, infrared network, and other networks.

The database application associated with instances 110 and 112 can be used in one or more of at least the following areas: database management, analytics and business intelligence, mobile enterprise, mobile messaging, mobile commerce, and modeling and development. This database application can be a multi-tenant application, where multiple tenants (for example, computing devices 106 and 108) can simultaneously use and update a same application executed over a distributed computing landscape including a plurality of computing systems.

Figure 2:
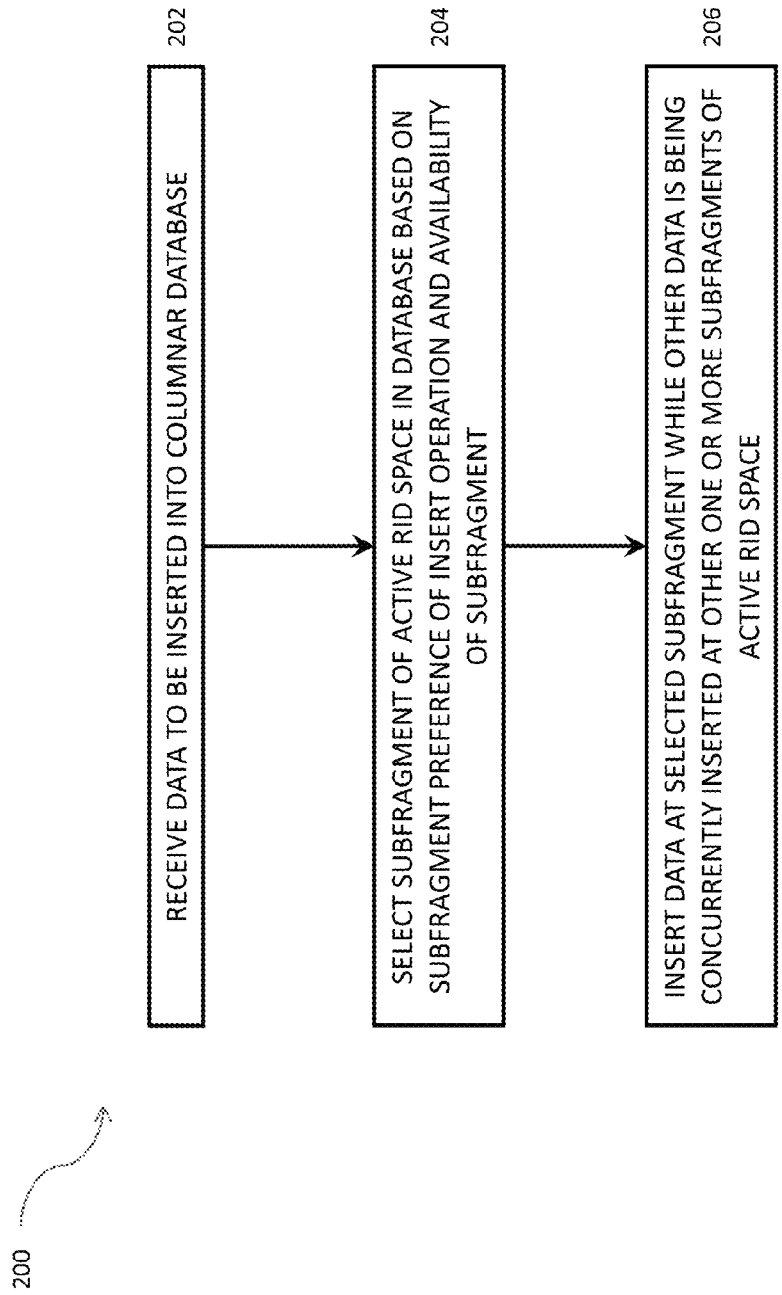
FIG. 2 is a flow-diagram illustrating a concurrent insertion of data associated with various computing threads into a columnar database.

FIG. 2 is a flow-diagram 200 illustrating a concurrent insertion of data associated with various computing threads into a columnar database 102. The server system 104 can receive, at 202 and from a computing device 106 of a first user 114, data to be inserted into the columnar database 102. Additionally, the server system 102 can explicitly receive a request in the form of an insert operation from the computing device 106 to insert this data.

For a table, the server system 104 can then select, at 204, a sub-fragment of an active fragment in the columnar database 102 based on a sub-fragment preference associated with the insert operation and when the sub-fragment is available for selection. Each insert operation can be executed by the thread having a logic identifier, which identifies the sub-fragment preference of insertion. The active fragment can be a portion of a row identifier space that identifies one or more rows that are currently available for inserting new transactions of data to. The active fragment is described in more detail below by diagram 500. A sub-fragment can allow a single insert operation to insert data into one or more rows identified by the sub-fragment; accordingly, a particular sub-fragment is: unavailable for selection when an insert operation is acting to insert data into one or more rows identified by that particular sub-fragment, and available for selection when no insert operation is acting to insert data into one or more rows identified by that particular sub-fragment. If a sub-fragment is never used, no resource is allocated for that particular sub-fragment.

The pseudo code for above-noted selection of a sub-fragment is presented below:

---
Subfragment Allocator Pseudo Code:
---

```
int Function AllocateSubFragment( subfragmentPreferenceId )
    // if no preference is specified, start the search from id zero.
    If( subfragmentPreferenceId == -1)
        subfragmentPreferenceId = 0;
    EndIf
    // if preference is greater than max allowed subfragment (which is
    // nothing but number of core on the machine), bring
    // subfragmentPreferenceId in allowed limit.
    If ( subfragmentPreferenceId > MaxAllowedSubfragmentCount )
        subfragmentPreferenceId =
            subfragmentPreferenceId %
            MaxAllowedSubfragmentCount
        // where % is remainder
    EndIf
    // try to get lock on subfragment
    While( ! SubfragmentArray[ subfragmentPreferenceId ].-
    TryLock( ))
        //sub fragment is already allocated, try to acquire next sub
        //fragment
        subfragmentPreferenceId = subfragmentPreferenceId + 1 ;
        If ( subfragmentPreferenceId >
        MaxAllowedSubfragmentCount )
            subfragmentPreferenceId =
                subfragmentPreferenceId
                %MaxAllowedSubfragmentCount
        EndIf
    EndWhile
    return subfragmentPreferenceId
End Function
```

The above-noted sub-fragment allocation is further described here. Sub-fragment allocator can be responsible for allocating sub-fragment id for insert operations. Insert operation can request for a particular sub-fragment id (preferred sub-fragment id). If preferred sub-fragment id is available, it can be given to operations otherwise allocator sequentially searches for free sub-fragment id from preferred sub-fragment id. If sub-fragment preference is not specified, allocator can search sub-fragment from sub-fragment id zero.

Query processing layer can assign an id to each insert thread, wherein this id can be called a shadow id. If insert/load statement is split into multiple insert operations on the store, these operations can be executed in parallel. Each such operation can be assigned a unique shadow id that can be greater than or equal to zero (that is, shadow id>=0). If insert/load is executed serially, only one thread can be inserted into store. Shadow id for such a serial operation/thread can be -1 (that is, shadow id=-1). In case of parallel load, each insertion thread can have a different shadow id, which can be passed as preferred sub-fragment id to the allocator. There may be no contention in sub-fragment allocation as each thread can ask for a different sub-fragment id. -1 preferred sub-fragment id can be considered as no preference for any particular sub-fragment. So serial insert operations can always show no preference for any sub-fragment. Allocator can always try to start the search for free/available sub-fragment from sub-fragment id zero. Sub-fragment storage can be created on demand. The first insertion into the sub-fragment can causes allocation of data blocks and initialization of internal storage data structure. If a sub-fragment is never used, overhead of such sub-fragment can be negligible.

For a table, the server system 104 can insert, at 206, data in one or more rows identified by the selected sub-fragment while the server system concurrently inserts other data in one or more rows identified by other one or more sub-fragments of the active fragment.

The pseudo code for the above-noted insertion is noted below:

---
Pseudo code for insert operation
---

```
Function Insert(ColumVectors[ ], NumberOfRows,
subfragmentPreference)
    SubFragmentId = AllocateSubFragtment(subfragmentPreferenceId )
    Foreach CV in ColumVectors[ ]
        CF = GetColumnFragment( CV )
        SF = CF. GetSubFrgament(SubFragmentId)
        // subfragment store is not created,
        If ( SF == NULL)
            SF =
            CF.CreateSubframent(SubFragmentId)
        End If
        SF.InsertIntoStore( CV )
    End Foreach
    //increment row count for given subfragment id.
    IncrementRowCount(SubFragmentId, NumberOfRows)
    FreeSubFragment(SubFragmentId)
End Function
```

To access the data in the database 102, the server system 104 can perform a read operation. The read operation can either be a fetch based read operation or a column scan, both of which are described below.

Fetch based read operation: In the fetch based read operation, the read operation can create a fetch cursor over the store and can use this cursor for fetching data. The cursor can internally maintain states associated with last accessed data. The fetch cursor state can include the following parts: 1) Last rid accessed (this row identifier is the actual position of the row in the fragment); 2) Pointer to last data block accessed; 3) Cursor on row identifier mapper; and 4) Pointer to last accessed sub-fragment. If next read for a row identifier is part of last accessed sub-fragment, existing state in cursor can be used to locate the cell in last accessed sub-fragment; otherwise, current state of the cursor can become invalid and new state can be reconstructed for the next row identifier. Reconstruction of state can involve the following: 1) Sub-fragment is identified where the rid resides; 2) The sub-fragment pointer can be cached inside the cursor; 3) Exiting row identifier mapper cursor can be reinitialized with the newly cached sub-fragment; and 4) Last row identifier accessed and pointer to last data block accessed can be invalidated. In general, read operations can be sequential, and work with existing state of the cursor can be fetched. Having multiple sub-fragments inside the store may not impact the performance of read operation because cursor can cache the sub-fragment information and most of the requests can be served based on cached information. The invoker of the fetch is required to provide the row identifier in fragment-space (i.e., actual position of the row within the fragment).

The pseudo code for the fetch based read operation is presented below.

Pseudo code for read operation:

```
Function CursorFetch(SearchRid, out data)
    If( lastAccessedSubfragment.MinRid <= SearchRid
        && lastAccessedSubfragment.MaxRid >= SearchRid )
            FetchData(lastAccessedSubfragment, SearchRid, out data)
    Else
        int subfragmentId = lastAccessedSubfragment.Id;
        Loop
            subfragmentId = subfragmentId + 1
            If( subfragmentId >
            MaxAllowedSubfragmentCount )
                subfragmentId = 0
            endIf
            lastAccessedSubfragment =
            subfragamentArray[subfragmentId];
            If( lastAccessedSubfragment.MinRid <= SearchRid
                && lastAccessedSubfragment.MaxRid >=
                SearchRid )
                    FetchData(lastAccessedSubfragment,
                    SearchRid, out data)
                    Break Loop
            EndIf
        EndLoop
    EndIf
EndFunction
```

Column scan: Column scan is another type of read operation. In the above-noted fetch based read operation, user of the store can fetch data into their layer and can perform operation on the fetched data. However, in case of column scan, operations can be pushed into the row-level versioned store, and can be applied on data during column scan. In sub-fragment implementation, column scan on a fragment can be broken into multiple column scans on the sub-fragment. Experimentally, it has been observed that overhead of creating multiple column scans on sub-fragment is negligible.

The pseudo code for the column scan is presented below.

Pseudo code for column scan:

```
Function ColumnScan( Operation, InputFoundSet )
    //iterate over all subfragment
    ForEach subfragment in subFragmentArray
        // if subfragment range has overlapping area with input found
        // set scan the current subfragment.
        If ( subfragment.IsNotEmpty( )
```

Pseudo code for column scan:

```
            InputFoundSet.MinRid  <= subfragment. MaxRid &&
            Subfragment.MinRid    <= InputFoundSet.MaxRid )
            //Initialize the store scan data structure with current
            //subfragment.
            ReinitializeCurrentScanWithSubFrament( subfragment ) ;
                // Perform scan in subfragment store.
            ColumnScanOnStore(Operation, InputFoundSet);
        EndIf
    EndForEach
EndFunction
```

Figure 3:
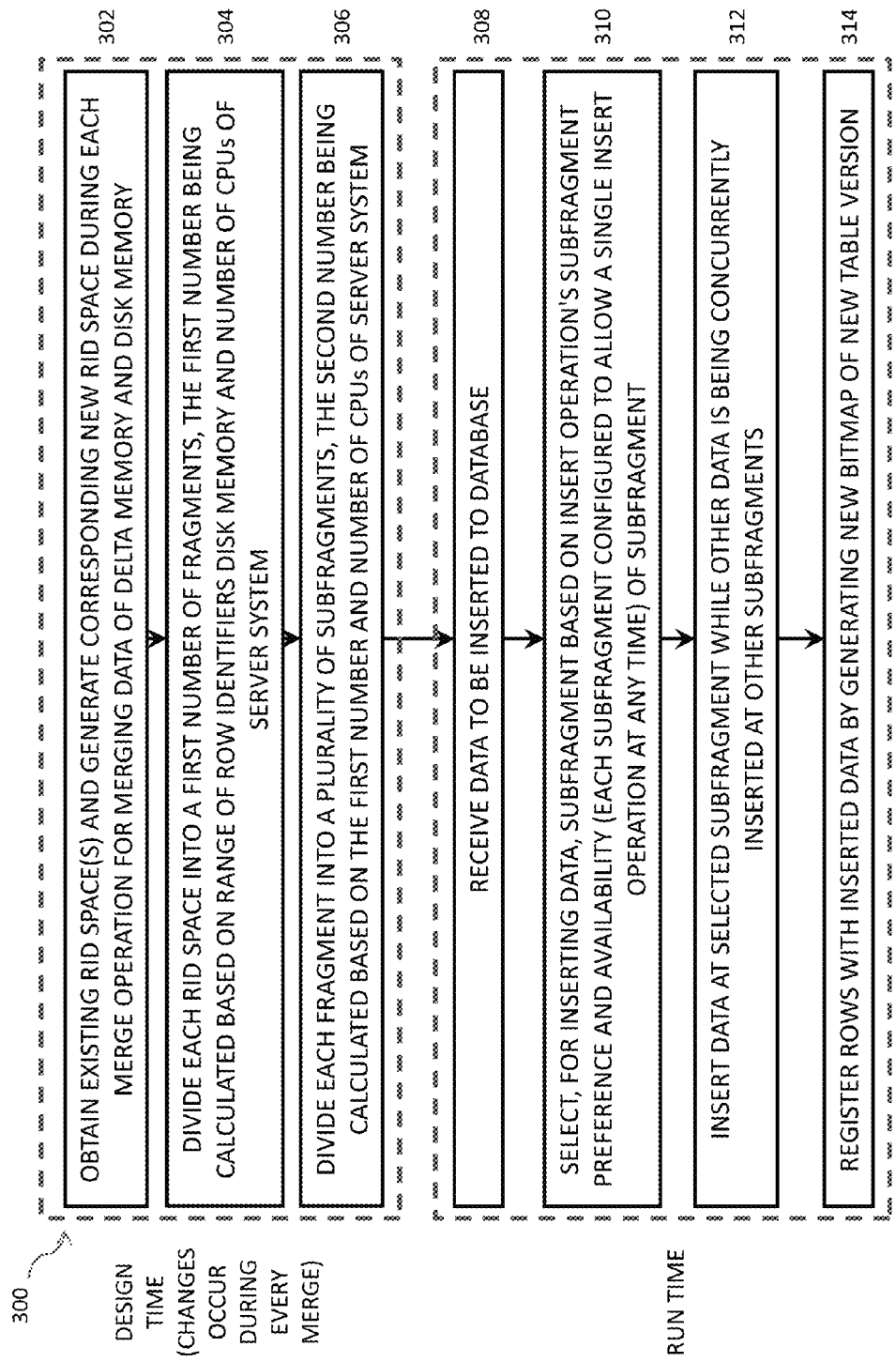
FIG. 3 is a flow-diagram illustrating a division of a row identifier space into fragments and sub-fragments, and concurrent insertion of data into one or more rows identified by corresponding sub-fragments.

FIG. 3 is a flow-diagram 300 illustrating for a table a division of a row identifier space into fragments and sub-fragments, and concurrent insertion of data into one or more rows identified by corresponding sub-fragments. The server system 104 can receive, at 302, existing row identifier spaces. The server system 104 can also generate, at 302, new row identifier spaces during each merge of some data in delta memory store with main store, as noted above.

The server system 104 can divide, at 304, each row identifier space into a first number of fragments. The first number can be calculated based on a range of row identifiers and a number of central processing units (CPUs, also referred to as cores) of the server system 104. For example, when main store uses row identifier space associated with row identifiers ranging from 1 to $2^{48}$ and delta memory store uses row identifier space associated with row identifiers ranging from $2^{48}+1$ to $2^{64}$, the first number is equal to: $\{(2^{64}-(2^{48}+1))/$Number of fragments in the row identifier space$\}$, wherein the number of fragments in the row identifier space can be equal to a configurable/changeable database-wide value of the database 102. Because a new fragment is created every time a merge occurs, this database-wide value also determines a number of merges that a long running transaction can survive before more merges of the table are not possible. This database-wide value also determines the number of row identifier spaces. In one example, this database-wide value can be ten.

The server system 104 can divide, at 304, each fragment of the row identifier space into a second number of sub-fragments. The second number can be based on the first number and the number of central processing units (CPUs, also referred to as cores) of the server system 104. For example, when the part of the table stored in main store (for example, disk memory store) uses row identifier space associated with row identifiers ranging from 1 to $2^{48}$ and the part of the table stored in the delta memory store uses row identifier space associated with row identifiers ranging from $2^{48}+1$ to $2^{64}$, the second number is equal to: $\{$(First number)/(Number of CPUs of the server system 104)$\}$.

In one possible implementation, the server system 104 may not perform division into fragments at 304, and instead may directly divide the row identifier space into a plurality of sub-fragments. A count of sub-fragments in this plurality of sub-fragments can be equal to: $[\{(2^{64}-(2^{48}+1))/$Number of fragments in the row identifier space$\}/$(Number of CPUs on the server system 104)$]$. Here, the number of fragments in the row identifier space can be equal to a configurable/changeable database-wide value of the database 102. Because a new fragment is created every time a merge occurs, this database-wide value also determines a number of merges that a long running transaction can survive before more merges of the table are not possible. This database-wide value also determines the number of row identifier spaces.

The server system 104 can receive, at 308 and from a computing device 106 of a first user 114, data to be inserted into a table in the columnar database 102. Additionally, the server system 102 can explicitly receive, at 308, a request in the form of an insert operation from the computing device 106 to insert this data. The server system 104 can then select, at 310, a sub-fragment of the active fragment for the table in the columnar database 102 based on a sub-fragment preference specified by the insert operation and when the sub-fragment is available for selection. Each insert operation can be executed by the thread having a logic identifier, which identifies the sub-fragment preference of insertion. The sub-fragment preference can be a global database-wide value associated with the database 102. Subsequently, the server system 104 can insert, at 312, data in the selected sub-fragment while the server system can concurrently insert other data in one or more rows identified by other one or more sub-fragments of the active fragment.

The server system 104 can register, at 314, the rows with the inserted data. The server system 104 can generate a new bitmap every time new data is inserted so as to register the rows with inserted data. Bitmaps are defined and described in more detail below. The server system 104 can use a bitmap to: (a) indicate rows of a table that are visible to or available for a particular transaction, (b) indicate rows that a transaction has inserted or deleted in the main store and/or the delta memory store, and (c) indicate, when a user 114 or 116 queries a database, the rows that meets a certain condition associated with the query by the user 114 or 116.

A bitmap can be a map that represents a set membership. For example, for a set B of values 0 to N, a bitmap BM for a subset B of A represents a function BM: A→{0, 1} such that for an element e of A, BM(e) is 1 if e is in B, and 0 if e is in (B−A). The bitmap can be one of: RvBitmaps, FragBitmaps, and MainBitmaps. The RvBitmaps are bitmaps where the row identifiers represent rows in the delta memory store part of the table only; the actual row identifier numbers can exclude the range of row identifiers in main; and a row identifier space can be associated to each RvBitmap. The FragBitmaps are bitmaps where the row identifiers represent actual positions of the row in one particular fragment; each bitmap includes row identifiers for one and only one fragment; and no row identifier space information is associated to these bitmaps. The MainBitmaps are bitmaps where the row identifiers correspond to rows in main only; and no row identifier space information is associated to these bitmaps.

To keep track of rows inserted and deleted by each transaction as well to determine the rows in each particular version of each table, each table version can be associated with the following three bitmaps: (a) an RvBitmap specifying the rows in delta; (b) an RvBitmap specifying the rows in delta that must be excluded (they have been deleted from delta); and (c) a MainBitmap specifying the rows in delta that must be excluded (they have been deleted from main). For transactions, the server system 104 can maintain the RvBitmap and the MainBitmap. For tracking inserts, the server system 104 can maintain multiple bitmaps. When a new table version is established at the commit of each transaction, the server system 104 can compute bitmaps that determine the rows in the new table version by using the bitmaps of the most recent table version at the point of commit and by applying the bitmaps of the transaction.

The features of 302, 304, and 306 (and associated alternate features, as described above) can be static for all times except when a merge operation occurs to merge data between the delta memory store and the main store. The features 308, 310, 312, and 314 (and possible alternate variations) can occur in run-time, which is when the server system 104 receives a new data for insertion into an available sub-fragment.

Figure 4:
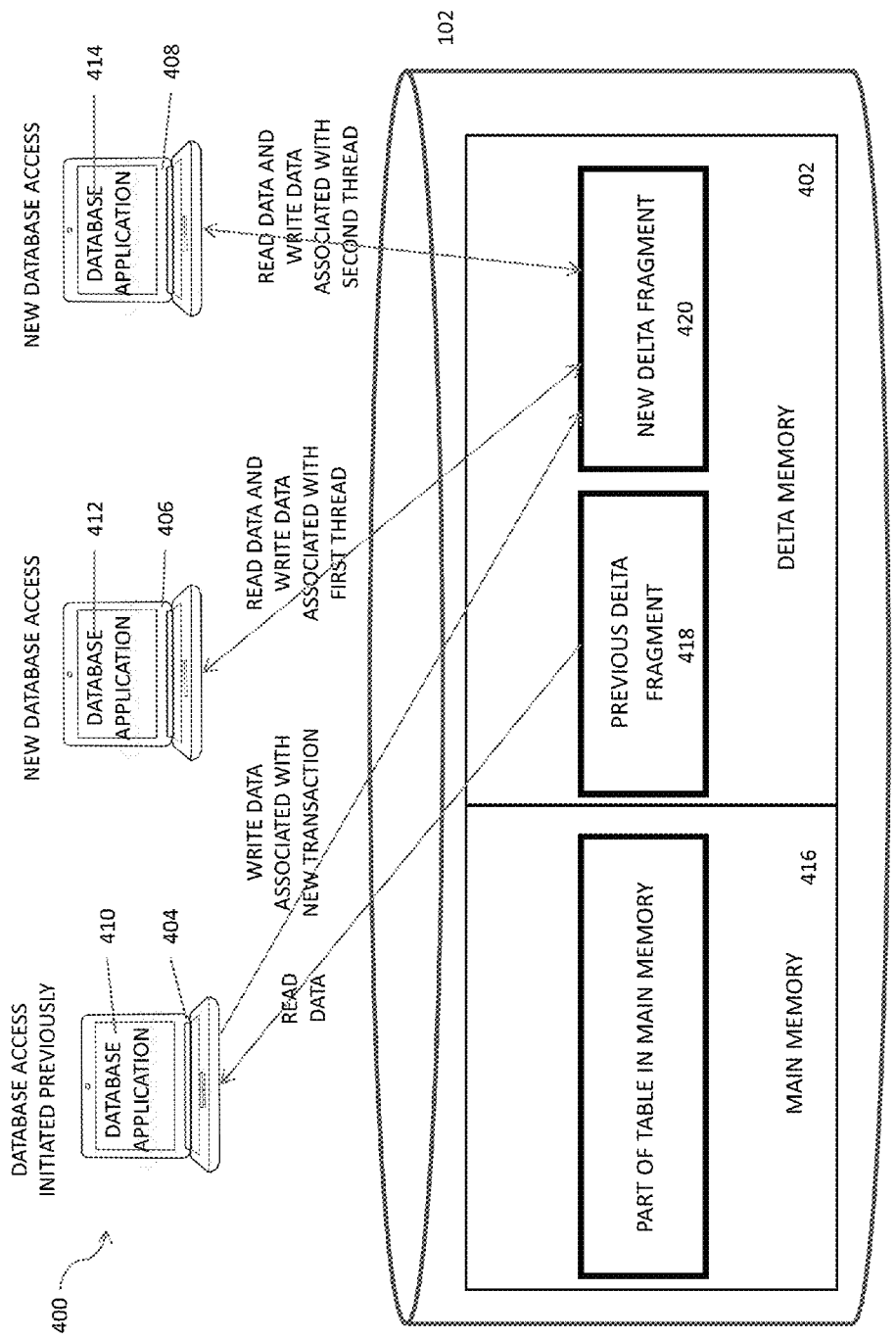
FIG. 4 is a system-diagram illustrating access of various fragments of a delta memory store of the database by various computing systems at a particular time.

FIG. 4 is a system-diagram 400 illustrating access of various fragments of a table in the delta memory store 402 of the database 102 by various computing systems 404, 406, and 408 at a particular time. Although the database 102 shows two fragments, in other implementations, there can be more than two fragments. The computing systems 404, 406, and 408 can execute corresponding instances 410, 412, 414 of a database application, one example of which can be an enterprise resource planning (ERP) application. The instance 410 of the database application begins accessing the table in database 102 before the particular time, and may have some old transactions as well as new transactions in progress. The instances 412 and 414 of the database application begin accessing the table in database 102 at the particular time, and may have only new transactions. The server system 104 allows the instance 410 of the database application to read data associated with old transactions from the previous delta fragment 418 of the table, and to write data associated with new transactions to only the new delta fragment 420 of the table. Additionally, the server system 104 allows the instances 412 and 414 of the database application to read data from and write data to only the new delta fragment 420 of the table. All the data of the previous delta fragment 418 of the table can be merged with the main store part of the table in database 102 at regular intervals of time or on-demand by an administrator of the database 102. Once all the old users stop accessing the previous delta fragment 418, the previous delta fragment 418 can be destroyed.

Figure 5:
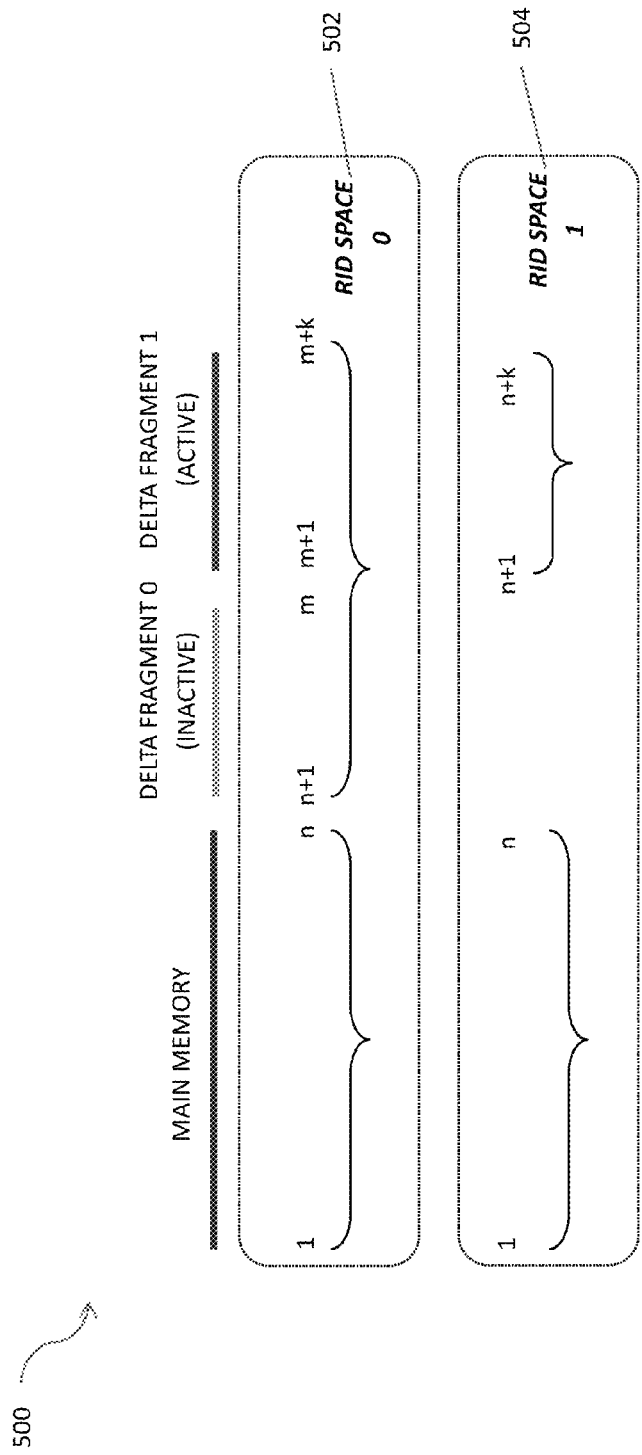
FIG. 5 is a diagram illustrating row identifier spaces, corresponding delta fragments, and rows identifiers included in each of those fragments.

FIG. 5 is a diagram 500 illustrating row identifier spaces, corresponding delta fragments, and rows identifiers included in each of those fragments. Although the database 102 shows two delta fragments for a table, in other implementations, there can be more than two delta fragments. The row identifier n can be equal to $2^{48}$, m can be equal to $\{(2^{48}+1)+(2^{64}-(2^{48}))/(\text{maximum number of fragments})-1\}$, and k can be equal to $\{(2^{64}-(2^{48}))/(\text{maximum number of fragments})-1\}$.

Here, row identifier space 502 has outlasted one merge operation. The row identifier space 502 can include two fragments: fragment0 and fragment1. Fragment0 can be used for read only by transactions that started prior or during the merge. Inserts can be written to the fragment1, which can be the active fragment. The row identifier space 504 can be the most recent row identifier space created on the latest merge. The row identifier space 504 may only have the active fragment. Transactions using this row identifier space can only have access to this fragment in delta. The data that transactions using the row identifier space 502 see in fragment0 can be seen by transactions using the row identifier space 504 in main, because associated rows in fragment0 have been merged to the part of the table in the main store. A row in fragment1 can be referenced using one row identifier by transactions in the row identifier space 502 and can be referenced with a different row identifier by transactions in row identifier space 504. For example, consider the first row in the fragment1. A transaction using row identifier space 502 can refers to that row with row identifier m+1 while every transaction on row identifier space 504 refers to that row with row identifier n+1.

Some of the terms and concepts described herein are further described in U.S. patent application Ser. No. 13/960, 335, entitled "A Delta Store Giving Row-Level-Versioning Semantics to A Non-Row-Level-Versioning Underlying Store," and filed on Aug. 6, 2013, the content of which is fully incorporated herein by reference in entirety.

Various implementations of the subject matter described herein can be realized/implemented in digital electronic circuitry, integrated circuitry, specially designed application specific integrated circuits (ASICs), computer hardware, firmware, software, and/or combinations thereof. These various implementations can be implemented in one or more computer programs. These computer programs can be executable and/or interpreted on a programmable system. The programmable system can include at least one programmable processor, which can be a special purpose or a general purpose. The at least one programmable processor can be coupled to a storage system, at least one input device, and at least one output device. The at least one programmable processor can receive data and instructions from, and can transmit data and instructions to, the storage system, the at least one input device, and the at least one output device.

These computer programs (also known as programs, software, software applications or code) can include machine instructions for a programmable processor, and can be implemented in a high-level procedural and/or object-oriented programming language, and/or in assembly/machine language. As can be used herein, the term "machine-readable medium" can refer to any computer program product, apparatus and/or device (for example, magnetic discs, optical disks, memory, programmable logic devices (PLDs)) used to provide machine instructions and/or data to a programmable processor, including a machine-readable medium that can receive machine instructions as a machine-readable signal. The term "machine-readable signal" can refer to any signal used to provide machine instructions and/or data to a programmable processor.

To provide for interaction with a user, the subject matter described herein can be implemented on a computer that can display data to one or more users on a display device, such as a cathode ray tube (CRT) device, a liquid crystal display (LCD) monitor, a light emitting diode (LED) monitor, or any other display device. The computer can receive data from the one or more users via a keyboard, a mouse, a trackball, a joystick, or any other input device. To provide for interaction with the user, other devices can also be provided, such as devices operating based on user feedback, which can include sensory feedback, such as visual feedback, auditory feedback, tactile feedback, and any other feedback. The input from the user can be received in any form, such as acoustic input, speech input, tactile input, or any other input.

The subject matter described herein can be implemented in a computing system that can include at least one of a back-end component, a middleware component, a front-end component, and one or more combinations thereof. The back-end component can be a data server. The middleware component can be an application server. The front-end component can be a client computer having a graphical user interface or a web browser, through which a user can interact with an implementation of the subject matter described herein. The components of the system can be interconnected by any form or medium of digital data communication, such as a communication network. Examples of communication networks can include a local area network, a wide area network, internet, intranet, Bluetooth network, infrared network, or other networks.

The computing system can include clients and servers. A client and server can be generally remote from each other and can interact through a communication network. The relationship of client and server can arise by virtue of computer programs running on the respective computers and having a client-server relationship with each other.

Although a few variations have been described in detail above, other modifications can be possible. For example, the logic flows depicted in the accompanying figures and described herein do not require the particular order shown, or sequential order, to achieve desirable results. Other embodiments may be within the scope of the following claims.

What is claimed is:

1. A method comprising:
receiving, by a server system comprising at least one data processor and from a computing device, data to be inserted into a database comprising a main store and a delta memory store;
selecting, by the server system, a sub-fragment of a row identifier space identifying identifiers of rows stored in a table of the database, the sub-fragment being selected based on a logic identifier of a thread and an availability of the sub-fragment, the sub-fragment being selected from a plurality of sub-fragments of the row identifier space, a count of the plurality of sub-fragments for the table being: {(a count of row identifiers in the row identifier space−(a count of row identifiers in a portion of the row identifier space associated with the main store+1))/count of delta fragments in the row identifier space}/(Count of central processing units on the server system); and
inserting, by the server system, the data in one or more rows identified by the selected sub-fragment while other data is being concurrently inserted in one or more rows identified by other one or more sub-fragments of the row identifier space.

2. The method of claim 1, wherein:
the database is a columnar relational database;
the main storage is a disk storage within the columnar relational database, the main store storing data that is different from data stored in the delta memory store; and
the delta memory store is an in-memory within the columnar relational database.

3. The method of claim 1, wherein the server system is connected to the computing device via a communication network.

4. The method of claim 1, wherein:
the count of row identifiers in the row identifier space is a first value; and
the count of row identifiers in a portion of the row identifier space associated with the main store is a second value that is less than the first value.

5. The method of claim 1, wherein the row-identifier space is a row-identifier space generated for the table when the server system most-recently merged data in the table stored in the delta memory store with a part of the table in the main store.

6. The method of claim 5, wherein the server system generates a new row-identifier space for the table with every merge of data of the table in the delta memory store with the part of the table in main store.

7. The method of claim 1, wherein:
the data inserted in the selected sub-fragment is associated with a first computing thread; and
the another data concurrently inserted in other one or more sub-fragments are associated with corresponding one or more computing threads that are different from the first computing thread.

8. The method of claim 7, wherein two or more computing threads are generated from corresponding two or more computing devices.

9. The method of claim 1, further comprising:
registering, by the server system, the rows with the inserted data by generating a bitmap that indicates the one or more rows in the database that includes the inserted data.

10. The method of claim 9, wherein the server system uses the bitmap to retrieve the inserted data from the database.

11. A system comprising:
a database comprising a main store and a delta memory store, the database comprising a table of a plurality of tables that comprises a plurality of row identifier spaces, a row identifier space of the plurality of row identifier spaces identifying rows stored in the table; and
a server system comprising at least one data processor, the server system receiving data to be inserted into the table of the database from a computing device, the server system selecting a sub-fragment of the row identifier space for the table based on a database-wide value and an availability of the sub-fragment, the sub-fragment being selected from a plurality of sub-fragments of the row identifier space, the server system calculating a count of delta fragments in the row identifier space, a count of the plurality of sub-fragments being: {(a count of row identifiers in the row identifier space−(a count of row identifiers in a portion of the row identifier space associated with the main store+1))/the count of delta fragments in the row identifier space}/(Count of central processing units on the server system), the server system inserting the data in one or more rows identified by the selected sub-fragment while other data is being concurrently inserted in one or more rows identified by other one or more sub-fragments of the row identifier space.

12. The system of claim 11, wherein:
the database is a columnar relational database; and
the server system is connected to the computing device via a communication network.

13. The system of claim 11, wherein:
the data inserted in the selected sub-fragment is associated with a first computing thread; and
the another data concurrently inserted in other one or more sub-fragments are associated with corresponding one or more computing threads that are different from the first computing thread.

14. The system of claim 13, wherein two or more computing threads are generated from corresponding two or more computing devices.

15. A non-transitory computer program product storing instructions that, when executed by at least one programmable processor, cause the at least one programmable processor to perform operations comprising:
receiving, by a server system comprising at least one data processor and from a computing device, data to be inserted into a database comprising a main store and a delta memory store;
selecting, by the server system, a sub-fragment of a row identifier space identifying identifiers of rows stored in the database, the sub-fragment being selected based on a database-wide value and an availability of the sub-fragment, the sub-fragment being selected from a plurality of sub-fragments of the row identifier space, a count of the plurality of sub-fragments for the table being: {(a count of row identifiers in the row identifier space−(a count of row identifiers in a portion of the row identifier space associated with the main store+1))/ count of delta fragments in the row identifier space}/ (Count of central processing units on the server system); and
inserting, by the server system, the data in one or more rows identified by the selected sub-fragment while other data is being concurrently inserted in one or more rows identified by other one or more sub-fragments of the row identifier space.

16. The computer program product of claim 15, wherein the sub-fragment is selected based on a sequential search of sub-fragment identifiers, and wherein a resource is allocated to the selected sub-fragment only when the selected sub-fragment is being used.

17. The computer program product of claim 15, wherein:
data in the database is accessed via a read operation, performance of the read operation being independent of the one or more sub-fragments and the concurrent insertion of data; and
the read operation comprises one of a fetch based read operation and a column scan operation.

* * * * *